United States Patent [19]

Sugalski

[11] 4,211,968
[45] Jul. 8, 1980

[54] BATTERY CHARGER ADAPTER

[75] Inventor: Raymond K. Sugalski, Gainesville, Fla.

[73] Assignee: General Electric Company, Worthington, Ohio

[21] Appl. No.: 878,453

[22] Filed: Feb. 16, 1978

[51] Int. Cl.² .......................................... H01M 10/46
[52] U.S. Cl. ...................................... 320/2; 339/228; 429/121
[58] Field of Search ................. 320/2, 3, 4, 25; 429/1, 429/7-9, 96, 97, 100, 121, 163; 339/184 M, 278 M, 29 B, 228, 256 R, 256 RT, 258 R, 258 A; 156/73.2, 73.4

[56] References Cited

U.S. PATENT DOCUMENTS

| 3,819,437 | 6/1974 | Paine | 156/73.4 |
| 3,874,963 | 4/1975 | Barger | 156/73.2 |
| 4,084,037 | 4/1978 | Morton | 429/1 |

Primary Examiner—Robert J. Hickey
Attorney, Agent, or Firm—Morgan, Finnegan, Pine, Foley & Lee

[57] ABSTRACT

A one piece molded, plastic body has two plate-like portions interconnected at associated edges by an integral hinge. The portions have molded in pockets for receiving a diode and transistor, and energy concentrator.

3 Claims, 8 Drawing Figures

BATTERY CHARGER ADAPTER

CROSS REFERENCE TO RELATED APPLICATIONS

This application is related to the following commonly assigned applications filed contemporaneously herewith: Ser. No. 877,297, filed Feb. 13, 1978; Ser. No. 877,281, filed Feb. 13, 1978; Ser. No. 877,299, filed Feb. 13, 1978.

BACKGROUND OF THE INVENTION

This invention relates to rechargeable batteries and more particularly to a simple, inexpensive, charging system whereby a rechargeable battery of the 9 volt physical size and/or electrical characteristics are selectively and alternatively connectible to a charge current source for recharging of the type described in U.S. Pat. No. 4,009,429.

There is an increasing number of consumer products being operated by rechargeable cells such as nickel-cadmium cells. These products require cells with a plurality of physical sizes and electrical characteristics. The variety of cell types in wide use in the consumer market has given rise to the need to provide a unitary charging device to accommodate the various cell types. One such device is described in U.S. Pat. No. 3,579,075 issued on May 18, 1971 and assigned to the assignee of the invention herein. While this device provides a viable approach for charging cells of a variety of types, it has failed to achieve widespread adoption in the consumer market because of its complexity and cost of construction. The system described in the above-identified U.S. Pat. No. 4,009,429 is useful in charging AA, C & D size batteries, but does not accept 9 volt size batteries. Commonly assigned application Ser. No. 877,297 discloses an improved system for 9 volt rechargeable batteries with the use of an adapter.

SUMMARY

The present invention is an improvement on the adapter described in Ser. No. 877,297 whereby 9 volt size batteries may be charged.

The system of this invention utilizes in combination a charger and 9 volt size battery which are interconnected by an adapter module. The adapter is designed to mechanically and electrically join the battery to the charger so that a highly compact system results. Electric means such as diodes and resistors are carried by the adapter to transform the charger characteristics to those useful for the 9 volt battery. Thus, the usefulness of the charger is expanded to include 9 volt size batteries. The adapter is a single molded housing having two folded portions interconnected by a hinge and ultrasonically bonded by means of integral energy concentrators.

DETAILED DESCRIPTION

Figure 1:
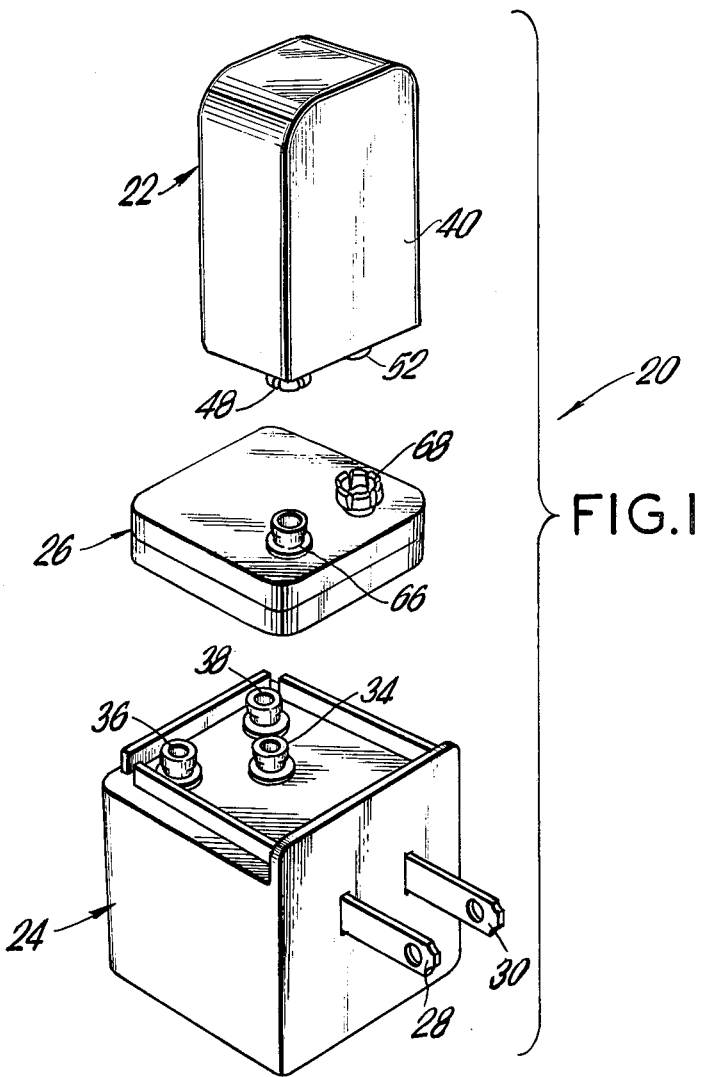
FIG. 1 is an exploded, perspective view of a charge current source, an adapter and a 9 volt battery of the present invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

The overall system 20 is shown in FIG. 1. System 20 includes a rechargeable battery 22, a source 24 and an adapter 26. FIG. 1 is an exploded perspective view of the components of the system when assembled for charging.

The Charge Source

Figure 8:
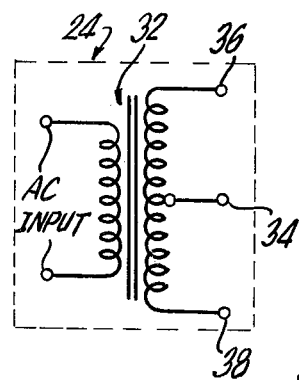
FIG. 8 is a circuit diagram of the charger, adapter and battery.

The charge current source 24 is comprised of a conventional high impedance center tapped transformer, which is illustrated schematically in FIG. 8 by block 24. Two blades 28, 30 are provided in one face of the charger housing for connection to a source of 120 VAC. Source 24 is available commercially from the assignee, General Electric Company, under the designation BC3 miniature charger, and is described in the above-identified U.S. Pat. No. 4,009,429.

As shown in FIG. 8, the source 24 comprises a transformer 32 to make available from the standard 110–120 volt cycle AC line an output current of appropriate magnitude for the load provided. Terminal 34 is centrally tapped to the secondary of transformer 32, while terminals 36 and 38 are end tapped to the secondary of the transformer.

As shown in FIG. 1, terminals 34, 36 and 38 are one-way, snap-type "male" terminals attached to a face of source 24.

The Rechargeable Battery

Figure 2:
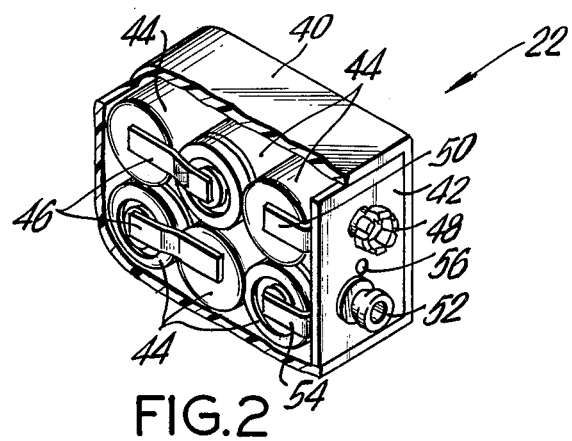
FIG. 2 is a perspective view of a 9 volt size battery with portions broken away for clarity of illustration.
Figure 3:
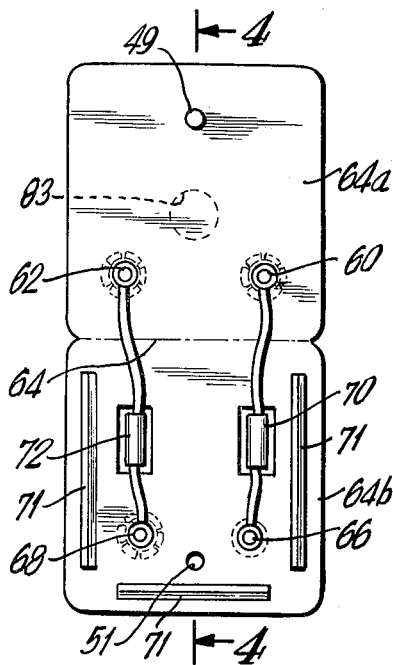
FIG. 3 is a plan view of an adapter in the open position.
Figure 4:
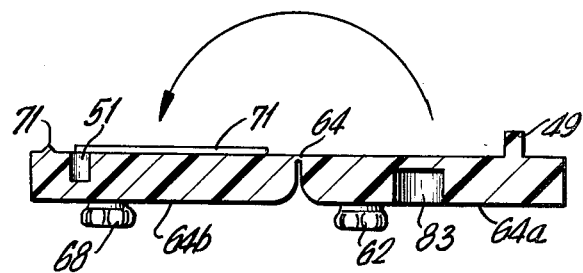
FIG. 4 is a cross-sectional view taken along line 4—4 in FIG. 3.
Figure 5:
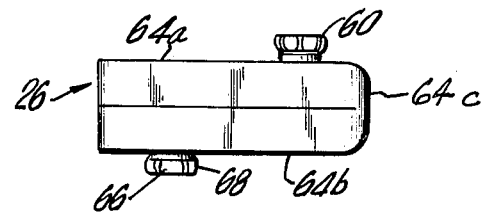
FIG. 5 is a side elevation view of the adapter of FIG. 3 in the assembled position.

Rechargeable battery 22, FIG. 2, includes a generally rectangular shaped housing 40 which is open at one end and closure end plate 42 which may be formed of an insulating plastic material such as polystyrene. End plate 42 is joined to housing 40 by means of adhesive or ultrasonic welding techniques.

Battery 22 is sized for 9 volt usage in its physical dimensions and includes 6 rechargeable nickel cadmium cells 44 having a nominal voltage of 1.25 V.D.C. The cells 44 are connected in series by conductive straps 46 (only two are illustrated).

The first cell 44 is connected to a female one-way snap terminal 48 carried on end plate 42 by conductive strip 50. The last cell 44 of the series is connected to a male one-way snap terminal 52 by conductive strap 54 to complete the electrical circuit of the battery, as shown in FIG. 8.

The Adapter

Adapter 26 is the bridging element between charger 24 and battery 22 and serves two functions; namely, physically attaching or mounting the battery and electrically connecting the terminals 36 and 38 of the charger to terminals 48 and 52 of the battery.

Figure 6:
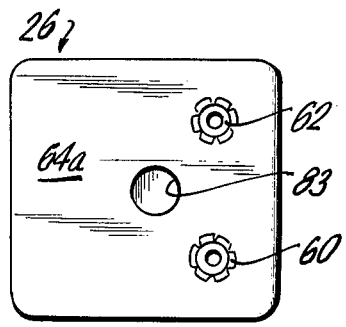
FIGS. 6 and 7 are bottom and top plan views of the adapter of FIG. 5.
Figure 7:
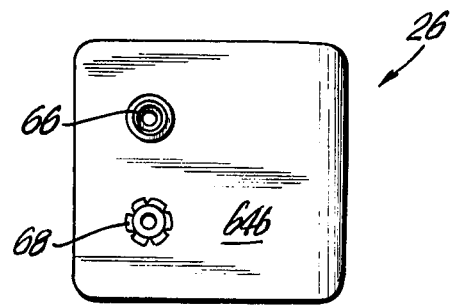

To these ends, adapter 26 includes a pair of one-way female snap terminals 60, 62 attached to one surface of housing 64, see FIG. 6, which interconnect with charger terminals 36 and 38, and on an opposite surface a second set of one-way snap terminals, a male terminal 66 and female terminal 68, FIG. 7, which interconnect with battery terminals 48 and 52, respectively. The one-way snap type terminal not only provides electrical contact but also mechanical gripping to support the battery on the charger.

Electrical circuitry is carried by the adapter to provide suitable conditioning of the source to battery characteristic by current and voltage control. To this end recitfying means, particularly a half-wave rectifier 70, such as a diode, is connected between terminals 60 and 66 and a resistor 72 is connected between termianl 62 and 68 to produce the circuit shown in FIG. 8. It will be appreciated by those skilled in the art that other arrangements of electrical components may also be utilized to provide suitable conditioning of the source to the battery.

Adapter housing 64 is preferably of a molded plastic construction. The adapter housing shown in FIGS. 3–7 has a fully enclosed structure formed by a housing portion 64a and closure portion 64b. Portion 64a and 64b are integrally joined by a hinge 64c.

The outer surface of bottom portion 64a, FIG. 6, carries charger terminals 60 and 62 and has a clearance area 83 for receipt of charger terminal 34. The interior surface of bottom portion 64a includes a molded locater projection 49, which mates with locater aperture 51 when the adapter is folded about hinge 64.

The outer surface of top portion 64b, FIG. 7, carries battery terminals 66 and 68. The inner surface includes cavities for receipt of diode 70 and resistor 72 and energy concentrator ridges 71. After the terminals, diode and resistor have been assembled on the adapter in the open position, FIGS. 3 and 4, the portion 64a is folded about hinge 64 to place the inner surfaces in abutting relationship and ultrasonic welding is performed with the aid of concentrators 71 to bond the adapter in the folded configuration shown in FIG. 5.

These and other modifications may be made to the invention without departing from the scope and spirit thereof as pointed out in the appended claims.

What is claimed is:

1. A charging adapter comprising a molded, insulating, unitary housing having first and second portions interconnected by an integral hinge at abutting edges thereof, whereby said portions may be folded over into abutting juxtaposition; said first and second portions having terminal contacts thereon on opposed surfaces thereof in the folded position, the interior juxtaposed surfaces having an ultrasonic energy concentrator thereof and cavities therein, electrical means connecting associated terminal contacts within said cavities, whereby when said adapter is subjected to ultrasonic energy a unitary adapter is formed.

2. The charging adapter of claim 1, wherein said energy concentrator is a rib.

3. The charging adapter of claim 1, wherein said interior surfaces further include means for aligning said first and second portions remote from said hinge.

* * * * *